United States Patent [19]

Valcho et al.

[11] 4,253,974

[45] Mar. 3, 1981

[54] OIL RECOVERY AND MOBILITY CONTROL IN SURFACTANT SYSTEMS USING THE REACTION PRODUCT OF AN ALKENYL SUCCINIC ANHYDRIDE AND A TERTIARY AMINE

[75] Inventors: Joseph J. Valcho, Naperville; Robert E. Karll, Batavia, both of Ill.

[73] Assignee: Standard Oil Company (Indiana), Chicago, Ill.

[21] Appl. No.: 954,933

[22] Filed: Oct. 26, 1978

Related U.S. Application Data

[63] Continuation-in-part of Ser. No. 827,567, Aug. 25, 1977, abandoned.

[51] Int. Cl.$^3$ .............................................. E21B 43/22
[52] U.S. Cl. .............................. 252/8.55 D; 166/274; 166/275; 252/356
[58] Field of Search .......................... 252/8.55 D, 356; 166/273, 274, 275

[56] References Cited

U.S. PATENT DOCUMENTS

| | | | |
|---|---|---|---|
| 2,458,425 | 1/1949 | Rocchini | 260/561 X |
| 2,588,412 | 3/1952 | Rocchini | 252/51.5 |
| 3,469,630 | 9/1969 | Hurd et al. | 252/8.55 X |
| 3,890,239 | 6/1975 | Dycus et al. | 252/8.55 |
| 3,977,471 | 8/1976 | Gale et al. | 166/273 |

*Primary Examiner*—Herbert B. Guynn
*Attorney, Agent, or Firm*—Mark DiPietro; William T. McClain; William H. Magidson

[57] ABSTRACT

A method for recovering oil from an oil bearing formation which comprises injecting into the formation an aqueous fluid comprising an effective amount of the reaction product of an alkenyl succinic anhydride and a tertiary amine.

6 Claims, No Drawings

OIL RECOVERY AND MOBILITY CONTROL IN SURFACTANT SYSTEMS USING THE REACTION PRODUCT OF AN ALKENYL SUCCINIC ANHYDRIDE AND A TERTIARY AMINE

This application is a continuation-in-part of Ser. No. 827,567 filed Aug. 25, 1977 now abandoned.

BACKGROUND OF THE INVENTION

1. Field of the Invention

The field of art to which this invention pertains is oil recovery methods using surfactants and mobility control of surfactant slugs in oil recovery processing. Relevant art is contained in U.S. Classification 166-273, 274, and 275.

2. Detailed Description of the Prior Art

Relevant prior art includes additive compositions including those characterized as water-insoluble mineral oil additives which are produced from the reaction of alkenyl-substituted succinic acid anhydrides and a tertiary amine as disclosed in U.S. Pat. No. 2,588,412. Oil-soluble polyvalent metal salts of an alkenyl-succinic acid monoamide are also disclosed in U.S. Pat. No. 2,458,425. Both of these patents are classified in U.S. Classification 260-561 and are limited to the use of such materials as additives for mineral oil or lube oil uses. Russian Pat. No. 459-461 cited in the A.P.I. Patent Alert as No. 76-30307 relates to formation of an ester-acid product from the reaction of an alkenyl succinic anhydride and a tertiary amine.

It has been recognized in the petroleum industry that oil recovery methods using surfactants can be used to effectively remove oil from a subterranean reservoir which has been subjected to straight water flooding or polymer flooding operations. Without the use of surfactants or materials which can help remove this oil from the interstitial spaces within the reservoir, it is essentially non-recoverable.

The art has also recognized that when using surfactants many problems exist when these materials are used in reservoirs of elevated temperatures about 140° F. or higher. Surfactant solutions will lose viscosity and will not perform to their optimum capabilities when passed into high temperature reservoirs. Accordingly, then, mobility control additives are useful when added to such surfactant materials. Well known thickening agents include materials such as heteropolysaccharides produced by the bacteria of the genus Xanthomonas. More particularly, such materials are disclosed in U.S. Pat. No. 3,964,972.

The use of thickeners in surfactant slugs is disclosed, at least concerning using the polysaccharide materials, in U.S. Pat. No. 3,719,606 in which microemulsions of oil-soluble alkali metal sulfonates are used along with co-surfactants and from about 0.05 to about 1 percent by weight of a polysaccharide to enhance the viscosity of the microemulsion for improved oil recovery.

Some of the thickening agents now present on the market, including materials such as hydrolyzed polyacrylamides or copolymers of sodium acrylates or methacrylates and acrylamide, generally are not optimum candidates for use in surfactant slugs for oil recovery since in many instances these materials are not compatible with surfactant materials such as crude oil sulfonates, gas oil sulfonates or aliphatic polymer sulfonates. Many of the polyacrylamide-type materials when mixed with sulfonate surfactants precipitate, forming coagulated gels which may increase the residual resistance of an oil-containing reservoir to a point that moving additional fluid through it becomes very difficult if not impossible.

Many of the thickeners used, such as the polysaccharides or other water-soluble polymers, themselves do not contain sufficient surfactant properties to be used in a surfactant slug without reducing the surfactant's ability to move oil unless additional surfactant is used.

It would therefore be advantageous to use water-soluble thickeners which also possess surfactant properties in order that an increase in the viscosity of a surfactant fluid could be attained without losing surfactant properties by dilution of the surfactant by the water-soluble polymer. Accordingly, the present invention attains this situation by including, in one instance, in a surface-active fluid a viscosity-enhancing additive material which also contains sufficient surfactancy in order to act both as a viscosity thickening agent and a surfactant agent.

In another instance, the present invention provides a surfactant which possesses sufficient viscosifying properties in order that it may be used by itself in certain instances for recovery of oil from oil reservoirs where high viscosity surfactants are necessarily needed.

SUMMARY OF THE INVENTION

The present invention can be summarized as a process for recovering crude oil from a subterranean crude oil-bearing formation injecting into the formation an aqueous fluid comprising the reaction product of a tertiary amine of the formula $N(R_1)_3$ wherein each $R_1$ is independently selected from lower alkyls, hydroxyl-substituted lower alkyls and hydroxyl-substituted ethoxylated lower alkyls and an alkenyl succinic anhydride, wherein the alkenyl group has a molecular weight from about 100 to 600.

The present invention can also be summarized as a process for moving oil in a subterranean oil-bearing formation which comprises contacting said formation with an aqueous fluid containing an anionic surfactant which incorporates as an improvement in the process an amount of a surface-active agent which is the reaction product of a tertiary amine having the above general formula and an alkenyl succinic anhydride to enhance the viscosity of the resulting aqueous fluid for improved oil recovery from said reservoir.

It is an object of the present invention to present a process for moving oil from a subterranean oil-bearing formation by using a surface-active agent comprising the reaction product of a tertiary amine and an alkenyl succinic anhydride.

It is another object of the present invention to provide increased viscosity to an aqueous fluid which contains an anionic surfactant, especially sulfonate materials, which comprises incorporating into the aqueous fluid containing said surface-active agent an additional surface-active agent also containing viscosifying properties which comprises the reaction product of a tertiary amine and an alkenyl succinic anhydride.

In a broad embodiment, the present invention resides in a process for moving oil from an oil-bearing formation which comprises injecting into the formation an aqueous fluid containing an effective amount of the reaction product of a tertiary amine and an alkenyl succinic anhydride.

Another embodiment of our invention resides in a process for moving oil from an oil-bearing formation which comprises injecting into the formation an aqueous fluid containing an effective amount of an anionic surfactant, an improvement in such process which comprises incorporating into the aqueous fluid an effective amount of a surface-active agent comprising the reaction product of a tertiary amine and an alkenyl succinic anhydride.

These and other objects and embodiments of the present invention will be more fully explained after a review of the below detailed description of the invention.

DETAILED DESCRIPTION OF THE INVENTION

Briefly we disclose a method for recovering oil from an oil-bearing formation which comprises injecting into the formation an aqueous fluid containing an aqueous surfactant to displace the oil in the formation, said surfactant comprising an effective amount of the reaction product of an alkenyl succinic anhydride wherein the alkenyl group has an average molecular weight of about 100 to 600 and a tertiary amine of the formula $N(R_1)_3$ wherein each $R_1$ is independently selected from lower alkyls, hydroxy substituted lower alkyls and hydroxy substituted ethoxylated lower alkyls.

The tertiary amine reactant has the formula:

$$N(R_1)_3$$

wherein each $R_1$ substituent is independently selected from lower alkyls having less than about 7 carbon atoms per molecule, hydroxy-substituted lower alkyls and hydroxy-substituted ethoxylated lower alkyls, etc. In particular, lower alkyl materials which can comprise each $R_1$ substituents include materials such as methyl, ethyl, propyl, butyl, pentyl, isopropyl, isobutyl, etc. which themselves may contain hydroxy substituents such as hydroxyethyl and variously ethoxylated amyl alcohols, or mixtures thereof, but do not contain additional nitrogen atoms. $R_1$ preferably contains less than six carbon atoms to insure water-solubility. Preferably, the tertiary amine is triethanol amine for high surfactancy and low cost.

The alkenyl succinic anhydride can generally be prepared from the "ENE" reaction of maleic anhydride with olefinic polymers such as polybutenes or polypropylenes of average molecular weights of from about 100 to 600 or greater. In particular, these olefinic polymers can be produced from the cationic polymerization of olefins having from 3 to 6 carbons such as propene, 1-butene, or 2-butene, pentene, isopentene, hexene, 3,3-dimethyl butene, etc. or mixtures thereof. Depending upon the extent of polymerization and the catalyst and reaction conditions utilized, the alkenyl substituent will possess a varying range of molecular weights. It is necessary that the molecular weight range of the alkenyl and tertiary amine substituents be selected so as not to unduly interfere with the solubility of the produced succinate in both oil and water. A certain balance of solubility for water and oil is needed when this material is used either as a surface-active surfactant by itself or in conjunction with an anionic surfactant as a thickening agent possessing surfactant properties.

In some instances the alkenyl substituent itself can have substituents and still be considered an alkenyl substituent. For instance, there may be side chains of lower alkyl radicals or halide or other substituents present on this material as long as it does not unduly interfere with the basic property of this material, that is, possessing sufficient molecular weight for use in the present invention.

Especially useful alkenyl substituents include materials produced from viscous polybutene polymers having average molecular weights, depending upon their source. The resulting polybutenyl succinic anhydride is preferred for reason of low cost and ease of preparation. Materials specifically contemplated will have average molecular weights of around 280, 320, 340, and 420. These specific molecular weights are those from commercially available viscous polybutenes. However, other sources of such viscous polymers are not precluded, as are other molecular weight materials in variance from those described above. Polypropylene is also an excellent choice for the alkenyl substituent.

The alkenyl succinic anhydride is then reacted, preferably in a nonaqueous environment, with anywhere from about 0.7 to 1.3 equivalents of a tertiary amine to yield the desired reaction product. This material can form acid salts when placed in a suitable aqueous environment. In certain instances the above compound can form half-acids when contacted with water.

When using the claimed reaction product as the primary surface-active agent in miscible flooding for recovery of crude oil from underground formations, surfactant can be mixed with the connate water recovered from the reservoir or from the brine available from other sources. The aqueous mixture of the tertiary amine-alkenyl succinic reaction product can include materials known in the art such as water-soluble alcohols such as isopropyl alcohol, the oil-soluble alcohols containing no more than about 10 carbon atoms, and the 2 to 12 mole ethylene oxide adducts of primary alcohols and amines having from 4 to 16 carbon atoms, including such materials as n-butanol, 2-ethylhexanol, n-hexanol, n-octanol, n-decanol, and the like. In general, it is preferred to use the 6 to 8 mole ethylene oxide adducts of n-hexanol. These materials and others in this context are known as co-surfactant materials.

The co-surfactants can vary anywhere from a few tenths of a percent to 25 weight percent or more of the claimed succinamate material when it is the primary surface-active agent used in the miscible flooding process.

When the claimed reaction product is used as an additive component in an aqueous mixture containing another anionic surfactant, its concentration can vary depending upon its molecular weight, reservoir conditions and type of other anionic surfactant used, from less than 1 to 200 or more percent by weight of the other anionic surfactant or surfactants. Preferably, for maximum performance the weight ratio of the reaction product to sulfonate surfactant is from 0.1 to 1.5. Specifically, when the claimed reaction product is incorporated with other surfactants, these materials can include materials such as the sulfonates produced from 700° to 1100° F. fractions of crude oil as described in U.S. Pat. No. 3,302,713; overbased alkyl aromatic-type sulfonates as described in U.S. Pat. No. 3,965,984; petroleum sulfonates having specific ratios of aliphatic to aromatic protons as described in U.S. Pat. No. 3,997,451; and other alkyl aromatic ether sulfonates, especially those described in U.S. Pat. No. 3,977,471; and other surfactants well known to those in the art.

In instances in which the alkenyl succinic-tertiary amine reaction product described above is itself used in an aqueous mixture as the primary surfactant for treating a reservoir, the aqueous mixture contains about 1 to 15 percent by weight of the reaction product. In instances in which the claimed reaction product is added to an anionic surfactant, the aqueous mixture containing the surfactant is preferably followed by a mobility buffer slug. The mobility buffer slug can be an aqueous solution containing one or more mobility reducing agents including materials such as partially hydrolyzed high molecular weight polyacrylamides, high molecular weight polyalkylene oxide polymers, high molecular weight acrylamide polymers containing sulfo groups, copolymers of sodium acrylate or sodium methacrylate and acrylamide, biopolymers especially the polysaccharides, and other materials well-known in the art. The conditions under which these mobility buffer slugs are used will vary depending upon the reservoir conditions. In view of the well-known use of such materials, it is not necessary to further explain the specific manner in which these materials are used.

A water-drive can be injected into the reservoir to displace the aqueous mixture which contains the reaction product either as the primary surfactant or in combination with an anionic surfactant.

The following examples are presented to illustrate specific embodiments of the present invention and should not be used to unduly limit the scope of the claims.

EXAMPLE I

To a 1-liter 3-neck flask equipped with a stirrer, reflux condenser and a heating mantle was added 1 mole of a polybutenyl succinic anhydride (mole weight 380) and 0.9 moles of triethanol amine. The mixture was heated to 121° C. (250° F.) for 2 hours, was cooled and was ready for use.

EXAMPLE II

Example I was repeated with a polybutenyl succinic anhydride mole weight of 420.

EXAMPLE III

Example I was repeated with a polybutenyl succinic anhydride mole weight of about 440.

The various products of the examples were used as surfactants in sodium chloride solutions having varying concentrations. Various tests were performed on the products of the examples shown in Tables II and III.

The aqueous solutions used for testing were made by dissolving four to five grams of the reaction products of the above examples in about 45 grams of brine. The brines possessed sodium chloride salinities ranging from 0.2 N to 1.7 N. In some cases co-surfactants were added to adjust fluid stability in the indicated weight ratios.

The vial screening method was performed by placing twenty grams of the aqueous solution containing the surfactant produced in the examples in a small vial. Then two grams of a crude oil (Salt Creek Second Wall Creek Field in Wyoming) was placed in the vial. The vial was then gently turned over and it was observed whether or not the crude goes into the aqueous surfactant mixture or drops out of the solution entirely. The latter observation is indicative of a very high interfacial tension between the crude and aqueous surfactant phases and would generally indicate a poor recovery potential for crude from the pore volume of a subterranean formation.

If the crude and aqueous phases dissolve in each other or smear together then a low interfacial tension between the two phases can be predicted and an excellent miscibility rating is given. If some oil drops out of the aqueous solution, a borderline miscibility rating is given. The miscibility of crude and aqueous surfactant phases will sometimes fall between the two extremes and with a certain amount of skill can be generally given a moderate qualification as to interfacial tension with the crude.

In Table I below the relative range of miscibilities to the indicated brine concentrations are shown. The surfactants tested were mixed in the indicated weight ratios with an ethoxylated cocoamine sold under the trade name "Armak C/25 Ethomeen." The $R_1$ substituents were polybutene having the indicated average molecular weights.

TABLE I

| Product of Example and Average Molecular Weight of the Alkenyl Group | Weight Ratio product to Cosurfactant | Brine Concentration (N) | | | | | | | |
|---|---|---|---|---|---|---|---|---|---|
| | | 0.2 | 0.4 | 0.6 | 0.8 | 1.0 | 1.2 | 1.4 | 1.7 |
| Ex I   280 | 20/1 | | | | | — | ... | ... | ... |
| Ex II  320 | 15/1 | | | — | — | — | | | |
| Ex III 340 | 4/11 | — | — | — | — | — | — | | |

—Excellent Miscibility
...Borderline Miscibility

In this series of tests three micellar solutions were made from a sodium salt of a polybutene sulfonate and the products of the Examples. The sulfonate was about 49 percent active sulfonate, and had an average equivalent weight in the range of from about 400 to 450 with the equivalent weight ranging from about 200 to 1000.

Each solution was made by adding 5.3 grams of the above polybutene sulfonate to 50 grams of a sodium chloride brine having a specified sodium chloride concentration. To each solution was added 8 ppt, based on the brine, of a 6-mole ethoxylated hexyl alcohol co-surfactant. Where products of the examples were incorporated into the solution, the polybutene sulfonate quantity was reduced by the amount of triethanolamine-alkenyl succinic anhydride reaction product added. The base solutions are identified below:
Solution I: 0.3 N Brine
Solution II: 0.4 N Brine
Solution III: 0.6 N Brine In this example viscosity measurements were made on mixtures of the polybutene sulfonate and the products of the Examples, triethanol amine polybutene succinic anhydride reactor product and compared to solutions containing the polybutene sulfonate alone.

The viscosity measurements were made with a Brookfield spinning viscometer having a Thermosel attachment for performing tests at 140° F. (62° C.) using a No. 18 spindle.

TABLE II

| Solution | Grams Polybutene Sulfonate | Grams of reaction product of a triethanol amine and an alkenyl succinic acid compound | Viscosity (CPS) Using Brookfield No. 18 Spindle | | | | | |
|---|---|---|---|---|---|---|---|---|
| | | | 140° F. | | | Room Temp. | | |
| | | | 6rpm | 12rpm | 30rpm | 1.5rpm | 3rpm | 6rpm |
| I | 5.3 | — | 37 | 26 | 17 | — | — | — |
| I | 4.1 | 1.2 g. | | 50 | 29 | 85 | 48 | — |
| I | 4.5 | 0.8 g. | | 30 | 18 | — | — | — |
| II | 5.3 | — | 46 | 29 | 17 | — | — | — |
| II | 4.4 | 1.6 g. | | 55 | 30 | — | — | — |
| II | 4.1 | 1.2 | 86 | 42 | 19 | 260 | 181 | 100 |
| III | 5.3 | — | — | 20 | 16 | — | — | — |
| III | 4.1 | 1.2 | 89 | 45 | 25 | — | — | — |

An examination of Table II shows that using the triethanol amine reaction product of an alkenyl succinic acid compound optimizes the viscosity of the polybutene sulfonate surfactant solution. The high viscosity of the surfactant is needed to maintain mobility control during oil recovery operations at high temperature. The solutions displayed in Table II were retested in the viscometer at various shear rates at 60° C. and compared with the fluid containing 4.1 grams of polybutene sulfonate and 1.2 grams of the product of Example I, and III. No gelling is shown in the presence of the sulfonate.

The viscosity for base solutions I and III as described above was measured at various shear rates at 140° F. and compared with a fluid which contained 4.1 g. polybutene sulfonate and 1.2 g. of the reaction products of the Examples. As noted the base solutions contain co-surfactant.

TABLE III

| Fluid Description | Shear Rate (Sec.$^{-1}$) | Viscosity (CPS) |
|---|---|---|
| Solution I (5.3 g. Polybutene Sulfonate) | 16 | 25 |
| Solution I (5.3 g. Polybutene Sulfonate) | 40 | 18 |
| Solution I (5.3 g. Polybutene Sulfonate) | 80 | 12 |
| Solution I (4.1 g. Polybutene Sulfonate + 1.2 g. Prod. of Ex I) | 16 | 58 |
| Solution I (4.1 g. Polybutene Sulfonate + 1.2 g. Prod. of Ex I) | 40 | 29 |
| Solution I (4.1 g. Polybutene Sulfonate + 1.2 g. Prod. of Ex I) | 80 | 21 |
| Solution III (5.3 g. Polybutene Sulfonate) | 16 | 20 |
| Solution III (5.3 g. Polybutene Sulfonate) | 40 | 16 |
| Solution III (5.3 g. Polybutene Sulfonate) | 80 | 13 |
| Solution III (4.1 g. Polybutene Sulfonate + 1.2 g. Prod. Ex of I) | 16 | 45 |
| Solution III (4.1 g. Polybutene Sulfonate + 1.2 g. Prod. Ex of I) | 40 | 25 |
| Solution III (4.1 g. Polybutene Sulfonate + 1.2 g. Prod. Ex. of I) | 80 | 16 |

Table III shows the pseudo plastic property or the increased ability of the surfactant to maintain viscosity when subject to shear rates which simulate the forces the surfactant materials encounter in subterranean formations away from the injection site and high shear rates at the injection site. The viscometer is used to simulate the low shear placed on the surfactant solution by the passage of the surfactant through pores in the rock containing oil, and high shear found at the injection point. If the viscosity remains high at shear rates found in subterranean zones away from the injection site mobility control is maintained, to affect higher oil recovery. When the viscosity is low at high shear rates the surfactant solution is easily pumped into the formation.

We claim:

1. A method for recovering crude oil from a crude-oil bearing formation which comprises injecting into the formation an aqueous fluid to displace the oil in the formation comprising 1 to 15 wt.% based on the aqueous fluid of the reaction product, having both water and oil solubility, of an alkenyl succinic anhydride, wherein the alkenyl group has a molecular weight of about 100 to about 600, and about 0.7 to 1.3 equivalents of a tertiary amine of the formula $$N(R_1)_3$$

wherein each $R_1$ is independently selected from the group consisting of lower alkyls, hydroxy substituted lower alkyls and hydroxy substituted ethoxylated lower alkyls per equivalent of anhydride wherein the reaction product is both a surface active agent and a viscosity increasing agent.

2. The process of claim 1 wherein the alkenyl group is derived from the polymerization of a monomer selected from the group consisting of propene, 1-butene, 2-butene, isobutene, pentene and hexene, or mixtures thereof.

3. The process of claim 1 wherein $R_1$ is selected from the group consisting of methyl, ethyl, propyl, butyl and pentyl, or mixtures thereof.

4. The process of claim 1 wherein the tertiary amine is triethanolamine.

5. The process of claim 1 wherein the alkenyl succinic anhydride is a polybutenyl succinic anhydride.

6. The method of claim 1 wherein the aqueous surfactant fluid contains an effective amount of a sulfonate surfactant and 0.1 to 1.5 parts of the reaction product per part of sulfonate.

* * * * *